United States Patent [19]

Stanley

[11] 4,168,198
[45] Sep. 18, 1979

[54] APPARATUS FOR MAKING HOSE INCORPORATING AN EMBEDDED STATIC GROUND CONDUCTOR

[75] Inventor: John H. Stanley, Libertyville, Ill.

[73] Assignee: The Goodyear Tire & Rubber Company, Akron, Ohio

[21] Appl. No.: 868,234

[22] Filed: Jan. 9, 1978

Related U.S. Application Data

[62] Division of Ser. No. 802,404, Jun. 1, 1977, Pat. No. 4,108,701.

[51] Int. Cl.² .................. B29D 23/04; F16L 11/12
[52] U.S. Cl. ............................ 156/393; 29/33 F; 156/428; 156/433; 156/500
[58] Field of Search ............. 156/149, 393, 433, 156, 156/244.13, 244.15, 500, 494, 392, 428, 172, 495, 496; 264/103; 174/47, 69; 138/103, 138, 175, 173; 29/33 F, 33 D; 140/107; 361/215

[56] References Cited

U.S. PATENT DOCUMENTS

| | | | |
|---|---|---|---|
| 2,208,052 | 7/1940 | Pierce | 140/107 |
| 3,042,737 | 7/1962 | Brumbach et al. | 156/149 |
| 3,543,803 | 12/1970 | Chrow | 174/47 |
| 3,555,170 | 1/1971 | Petzetakis | 174/47 |
| 3,780,208 | 12/1973 | Whittaker et al. | 174/47 |

FOREIGN PATENT DOCUMENTS

| | | | |
|---|---|---|---|
| 813151 | 5/1959 | United Kingdom | 174/47 |
| 973750 | 10/1964 | United Kingdom | 174/47 |

*Primary Examiner*—Michael W. Ball
*Attorney, Agent, or Firm*—D. M. Ronyak

[57] ABSTRACT

An apparatus for the manufacture of a hose structure incorporating an embedded ground conductor comprising shortening a loosely braided bundle of fine conductor wire in the axial direction by compressing the bundle between two pairs of friction rollers rotating at different speeds. The wires are spread in a direction transversely of the bundle axis and flattened to form a ribbon type conductor that is laid on an uncured extruded tube, along the tube axis, and covered over with a textile wrapping and an elastomeric extrusion. Open steam curing of the structure results in a hose showing no appearance of an embedded conductor wire.

4 Claims, 4 Drawing Figures

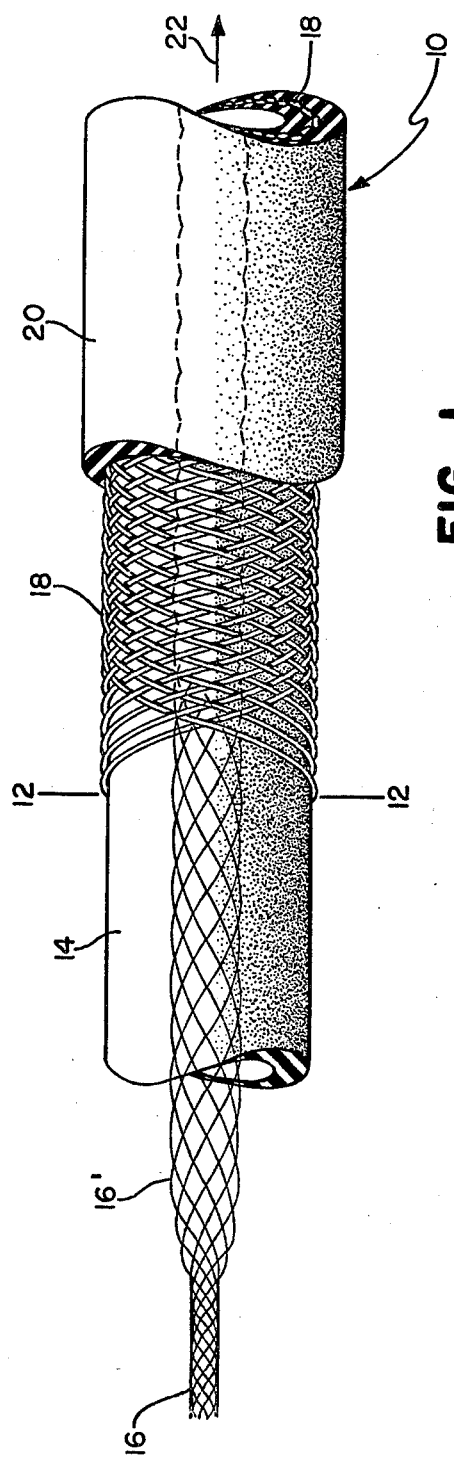
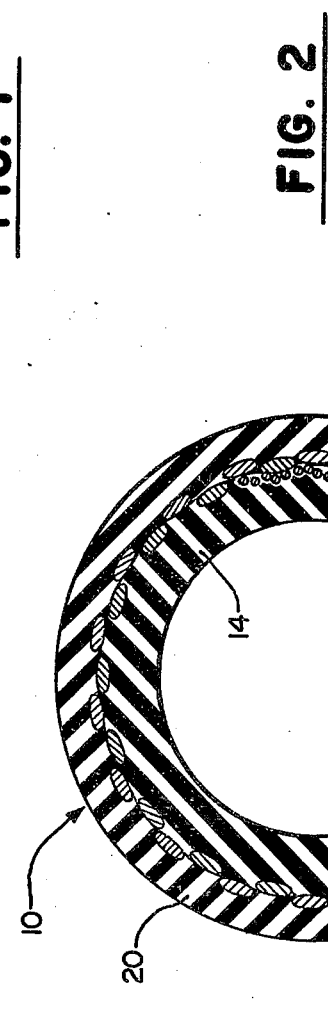
FIG. 1
FIG. 2

APPARATUS FOR MAKING HOSE INCORPORATING AN EMBEDDED STATIC GROUND CONDUCTOR

This is Division, of application Ser. No. 802,404 filed June 1, 1977, now U.S. Pat. No. 4,108,701.

BACKGROUND OF THE INVENTION

This invention generally relates to hoses and more particularly to a method and apparatus for making a hose structure having an embedded electrical conductor for preventing accumulated electrostatic charge.

There are various hose applications wherein an electrostatic charge poses a safety hazard in the use of the hose as for example, in the conveyance of inflammable fuels, grain materials, paint, etc. In this circumstance, attempts have been made to incorporate an electrical conductor into the body structure of the hose such that any accumulated charge may be dispersed and the hazard eliminated. These attempts generally involve spiralling an electrical conductor into the hose structure during the hose building operation and covering it with one or more layers of braided fabric and/or elastomer as exemplified in prior U.S. Pat. Nos. 3,543,803 and 3,780,208. The wire conductor is spiralled so that it flexes in the normal use of the hose and does not impair the flexibility of the hose.

A disadvantage of this type construction resides in the fact that the conductor by virtue of its cross-section, develops a ridge in the outer plies of the hose structure. The ridge is accentuated if the hose is built via non-mandrel construction techniques and cured without benefit of a lead covering. The lead press curing method is well known in the industry and generally involves internally pressurizing lengths of the hose, running it through a lead press to apply an outer sheath of lead, and curing the resulting structure in an autoclave. Upon finishing the cure, the lead sheath is stripped off and recycled. The lead press curing method, while providing a hose having an improved surface appearance, increases the manufacturing costs of a highly competitive product. Attempts at manufacturing hose having an embedded conductor using non-mandrel techniques and eliminating the lead press curing method have resulted in an increase in elastomeric covering material for the protection of the conductor wire. This of course has resulted in an increase in weight and cost of the product while not completely eliminating the unsightly ridge on the surface of the hose.

Other attempts at incorporating a static ground conductor in a hose structure, include various type flat or ribbon conductors as exemplified in U.S. Pat. No. 3,555,170 wherein copper threads and elastic yarn are woven into a tape or ribbon that is ultimately laid along the hose length, parallel to the hose axis. The ribbon conductor will thus stretch to accommodate hose elongation in the normal use of the hose. While this type conductor eliminates the ridge appearance and other disadvantages of spiralled conductors, it has the disadvantage of being difficult to handle in the course of a hose manufacturing process and it is a more expensive conductor to produce, thus again increasing the cost of a highly competitive product.

A solution to the above-mentioned problems may be had by incorporating a multiple wire braided conductor into the body structure of the hose as taught in U.S. Pat. No. 3,042,737. In this instance, the embedded conductor comprises a bundle of small diameter, braided wire conductors in a flattened configuration such as to exhibit the smallest cross-sectional area as the conductor is laid along the longitudinal axis of the hose. The present invention teaches a method and appratus for making a flexible hose structure incorporating a braided static conductor that remains invisible on the surface of the hose while maintaining the original flexibility of the hose. The invention takes advantage of non-mandrel construction techniques while also eliminating the lead press curing method. This is accomplished in apparatus comprising at least two pair of friction rollers placed immediately ahead of the braid point of a braiding machine as the hose is being built. The rollers are driven at different speeds so that the first of the pair operate to pull a braided bundle of wire conductors off of a supply spool while at the same time compressing the bundle against the second of the pair of rollers which are driven at a slower rotational speed. The wire bundle is thus shortened in the on-axis direction of the bundle and spread in the off-axis direction transversely of the bundle axis to form a flattened ribbon of wire conductors that are discharged at approximately the same speed as an uncured elastomeric hose tube moving relative to the pairs of rollers through the braider.

Various objects and advantages of the invention will become apparent from the following description with reference to the accompanying drawing wherein:

FIG. 1 is a side elevational view of a hose structure partially broken away to illustrate the orientation of the static conductor as may be applied by the apparatus of this invention;

FIG. 2 is a transverse sectional view of the hose shown in FIG. 1;

Figure 3:
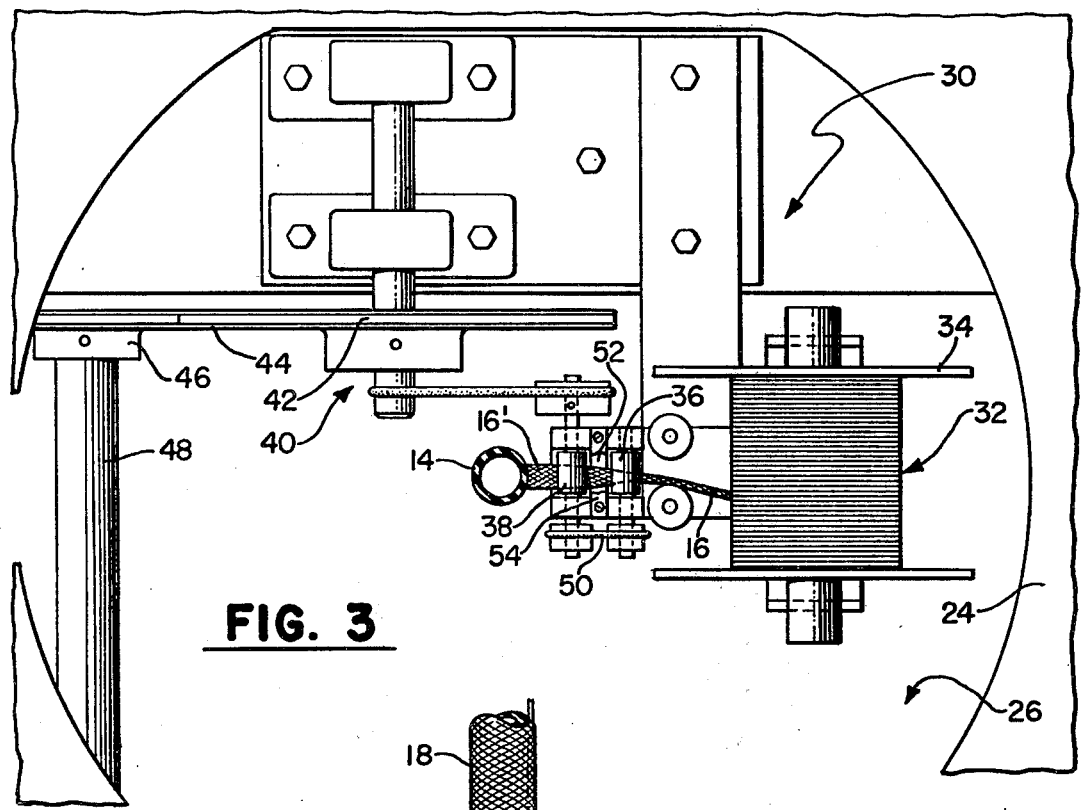
FIG. 3 is a top plan view of the apparatus forming the instant invention with the hose tube being shown as coming out of the page.

Referring to FIGS. 1 and 2, a hose as may be made by the method and apparatus of this invention is generally indicated by reference numeral 10. Conventionally, the hose 10 is built by extruding an elastomeric core tube 14 which may be closed at its ends and slightly pressurized to round out its cross section. The uncured core tube 14 is covered by a textile reinforcement 18 and ultimately by an extruded elastomeric cover 20. Upon application of the extruded cover 20, the hose is cured by conventional lead press curing techniques well known to those working in the art. Finally the lead sheath is removed and reused also in the well known and understood manner in the art.

According to this invention, a static ground wire 16 is laid on the core tube 14 just prior to the braid point indicated by line 12—12 as the core tube moves in the direction of arrow 22. The static wire 16 comprises in its initial form, a multi-strand bundle of fine conductor wires 16′ that are compressed in the axial direction such as to approximate a plurality of interweaving sinusoids as shown in FIG. 1. The circular cross section of the original bundle is thus expanded in the off-axis direction and flattened such as to exhibit a minimal cross sectional area.

Figure 4:
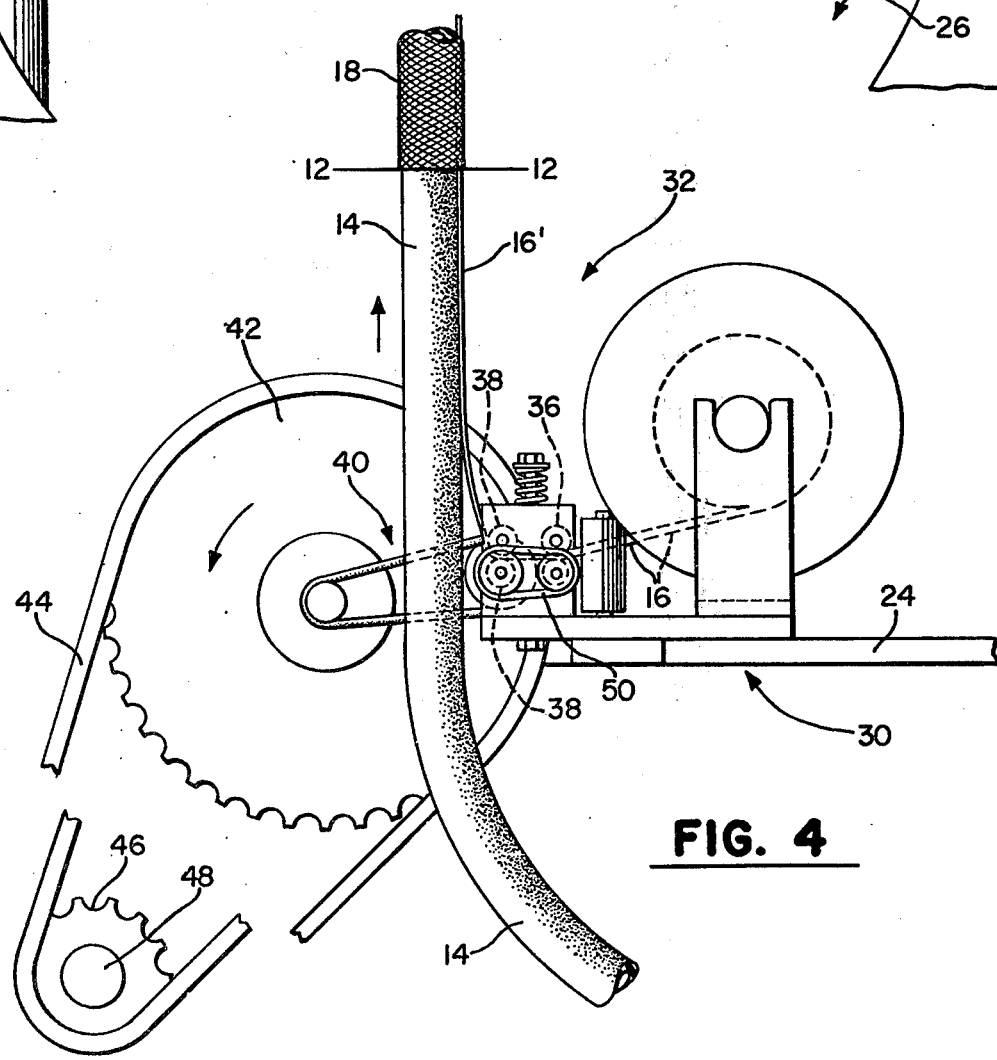
FIG. 4 is an elevational view of the apparatus shown in FIG. 3 showing a length of hose core tubing as it would be moved through the apparatus forming the instant invention.

Expanding of the multi-strand conductor wire is accomplished in apparatus generally indicated by reference numeral 30 in FIGS. 3 and 4. The apparatus 30 is mounted on a deck plate 24 of a conventional vertical braiding machine as made and marketed by The Textile Machinery Division of Rockwell International Corporation, Norristown, Pennsylvania.

The braider draws an uncured core tube 14 through the machine in a vertical direction by a driven, overhead mounted, large diameter pickup wheel (not shown). A textile material 18 is braided onto the core tube as it moves vertically through the machine whereupon it is picked up by the overhead wheel for transport to an extruder for application of a cover ply of elastomer.

The apparatus 30 is mounted to the braider deck plate 24 in a relative position to the hose core tube as it passes vertically upward through an opening 26 in the deck plate 24. The apparatus 30 comprises a source supply 32 of a loosely braided, bundle of small diameter flexible wires 16 mounted via a spool 34 in a substantially horizontal feed position to the deck plate 24. The apparatus 30 also comprises a first roller pair 36 mounted within the deck plate opening 26 in a position to accept the wire bundle 16 therebetween and a second roller pair 38 mounted downstream relative to the first roller pair such as also to receive the wire therebetween. The second roller pair is driven via a belt drive 40 off of a pulley 42 and belt 44 being in turn driven by a sprocket 46 mounted on the drive shaft 48 of the braiding machine. The first roller pair 36 is driven off of the second roller pair 38 by reason of a belt drive 50 and the arrangement of the driven roller pairs 36, 38 is such that pair 36 rotates at a faster speed than roller pair 38.

In operation of the apparatus 30, the loosely braided wire bundle 16 is picked up between the first roller pair 36 and moved to the second roller pair 38. Because of the difference in rotational speeds of the roller pairs 36, 38 the wire bundle 16 tends to be compressed in its axial direction and thus spread transversely of its axis as it moves between the two roller pairs 36, 38. Upon moving into the second roller pair 38, a vertical compressive force is applied to the spread wire bundle such as to flatten it further and then it is applied to the hose core tube 14, along its length and parallel to the hose axis as it ascends vertically through the braider. At the machine braid point, the textile is applied over the compressed and flattened conductor wire and it is held in place on the hose core tube by the tension of the textile braid. Upon being picked up by the overhead pick-up wheel, the hose is transported to the cover extruder and thereafter to an open steam curing chamber.

It is contemplated that various changes may be made to the apparatus without departing from the spirit and scope of the appended claims. For example, the roller pairs 36, 38 may be mounted vertically with respect to the braider deck plate 24. In this circumstance, other mounting means may be available or applied to the braider without any adverse affects on its operation. Further, it is anticipated that a pair of flat plates 52, 54 may be positioned between the roller pairs 36, 38 such as to maintain the on-axis orientation of the wire bundle between the rollers. These plates are shown in FIG. 3 with the top plate 54 being partially broken away to show the expanded static wire in its position between the rollers 36, 38. The plates, while maintaining the on-axis position of the wire, facilitate spreading of the wire conductors in the transverse or off-axis direction and also initial threading of the wire through the apparatus 30.

It will be appreciated that the drive arrangements of the rollers and the take-up wheel is such that the expanded and flattened conductor wire exits the second pair of rollers 38 at the same speed as the hose core tube is drawn through the braider. Thus, the static wire conductor is continuously applied to the core tube in a fast, efficient, economical and automated manner.

While certain representative embodiments and details have been shown for the purpose of illustrating the invention, it will be apparent to those skilled in this art that various changes and modifications may be made therein without departing from the spirit or scope of the invention.

What is claimed is:

1. In a hose manufacturing process wherein an unvulcanized, extruded, elastomeric tube is overlaid with a textile reinforcement material, apparatus for forming a hose structure having an electrical conductor embedded therein comprising in combination:

a wrapping machine for applying textile reinforcement to the tube as it passes through the machine;

a source of a bundle of loosely braided wire conductors;

a first driven pair of rollers positioned relative to the source and having sufficient compression between them to draw the bundle of wires from the source; and a second driven pair of rollers mounted in proximate position to the first pair to accept the bundle of wires from the first pair, said first pair of rollers being driven at a relatively faster speed than the second pair so as to compress the bundle in its axial direction between the first and second pairs of rollers to thereby shorten the axial length of the bundle and to effect a sinusoidal configuration to the individual wires of the bundle, said second driven pair of rollers also providing a compressive force to the axially shortened bundle to flatten the bundle transversely of its axis into a ribbon-like conductor, said roller pairs being mounted on the wrapping machine and positioned relative to the passing hose tube and just ahead of the wrapping point of the textile reinforcement so as to be overwrapped by the textile material as the ribbon conductor is applied to the hose tube along its longitudinal axis.

2. The apparatus as set forth in claim 1 wherein the hose wrapping machine is a vertical braider and said roller pairs are mounted on the braider in relative position to the braid point as the tube extrusion passes vertically through the braider.

3. The apparatus as set forth in claim 1 wherein the hose wrapping machine is a spiral wrapper and said roller pairs are mounted on the machine in relative position to the wrapping point as the tube extrusion passes through the wrapper.

4. The apparatus as set forth in claim 1 further comprising a pair of flat parallel plates mounted parallel to and between the roller pairs and spaced such that the bundle conductors, upon being compressed in their axial direction, are forced to move transversely of the bundle axis between the two plates.

* * * * *